(12) United States Patent
Yamakawa et al.

(10) Patent No.: US 7,518,809 B2
(45) Date of Patent: Apr. 14, 2009

(54) ULTRA WIDE-ANGLE IMAGING LENS DEVICE AND IMAGING APPARATUS

(75) Inventors: Hiromitsu Yamakawa, Saitama (JP); Ryoko Otomo, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 12/134,005

(22) Filed: Jun. 5, 2008

(65) Prior Publication Data

US 2008/0316618 A1 Dec. 25, 2008

(30) Foreign Application Priority Data

Jun. 25, 2007 (JP) ............................ P2007-166234

(51) Int. Cl.
G02B 13/04 (2006.01)
G02B 9/34 (2006.01)
G02B 13/18 (2006.01)

(52) U.S. Cl. .................... 359/753; 359/715; 359/781

(58) Field of Classification Search ......... 359/749–753, 359/713–715, 781
See application file for complete search history.

(56) References Cited

U.S. PATENT DOCUMENTS

| 7,375,906 B2* | 5/2008 | Hirose et al. ............. 359/749 |
| 2006/0187557 A1 | 8/2006 | Yamakawa |
| 2006/0227434 A1 | 10/2006 | Hirose et al. |
| 2007/0183062 A1* | 8/2007 | Nakamura ............... 359/781 |

FOREIGN PATENT DOCUMENTS

| EP | 1712943 A | 10/2006 |
| JP | 2002-244031 A | 8/2002 |
| JP | 2005-227426 A | 8/2005 |
| JP | 2006-259704 A | 9/2006 |
| JP | 2006-292988 A | 10/2006 |
| JP | 2007-025499 A | 2/2007 |

* cited by examiner

*Primary Examiner*—Scott J Sugarman
(74) *Attorney, Agent, or Firm*—Birch, Stewart, Kolasch & Birch, LLP

(57) ABSTRACT

An ultra wide-angle imaging lens device 1 includes, in order from an object side: a negative first lens L1 having a meniscus shape with a convex surface directed to the object side; a negative second lens L2 having a concave surface directed to an image side and having at least one aspheric surface; a positive third lens L3 having a convex surface directed to the object side and having at least one aspheric surface; a stop; and a positive fourth lens L4 having a convex surface directed to the image side and having at least one aspheric surface. The following conditional expression (1) is satisfied:

$$-3.2 < L/f_{34} < 3.2 \qquad (1)$$

where L denotes a distance on an optical axis from an object side surface of the first lens to an image formation surface, and $f_{34}$ denotes a composite focal length of the third and fourth lenses L3 and L4.

20 Claims, 11 Drawing Sheets

FIG. 11
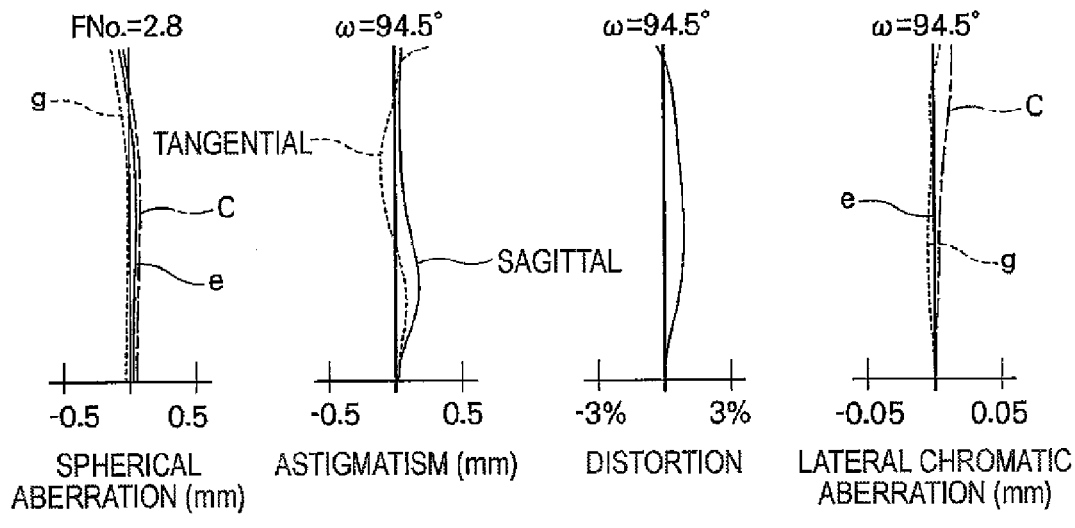
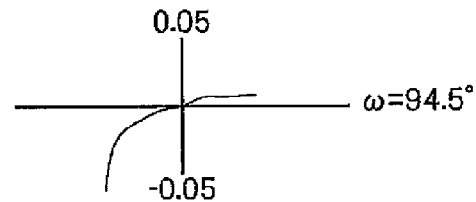
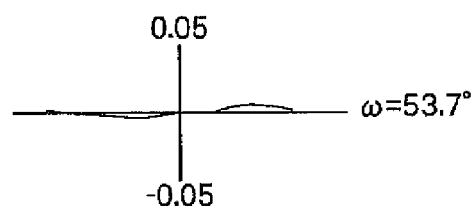
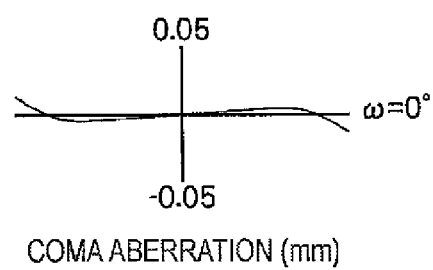
COMA ABERRATION (mm)

ULTRA WIDE-ANGLE IMAGING LENS DEVICE AND IMAGING APPARATUS

CROSS-REFERENCE TO RELATED APPLICATIONS

This application is based upon and claims the benefit of priority from the Japanese Patent Application No. 2007-166234 filed on Jun. 25, 2007; the entire contents of which are incorporated herein by reference.

BACKGROUND OF THE INVENTION

1. Technical Field

The invention relates to an ultra wide-angle imaging lens device and an imaging apparatus, particularly, to an ultra wide-angle imaging lens device that is suitable for use in an on-vehicle camera, an onboard camera, a cell phone camera, a surveillance camera, or the like having an imaging device such as a CCD (Charge Coupled Device) sensor or a CMOS (Complementary Metal Oxide Semiconductor) sensor, and to an imaging apparatus having the ultra wide-angle imaging lens device.

2. Description of the Related Art

In recent years, an imaging device such as a CCD sensor and a CMOS sensor has been more downsized and increased in the number of pixels. Accordingly, an imaging apparatus main body having such an imaging device has been also downsized, and a lens mounted thereon is required to be reduced in size and weight.

Also, an imaging lens device used in an on-vehicle camera, a cell phone camera, a surveillance camera, or the like is required to have high image quality in the overall effective picture plane even with its wide angle of view, in order to secure a good visual field in a wide area.

JP 2002-244031 A, JP 2006-259704 A (corresponding to US 2006/0187557 A), JP 2006-292988 A (corresponding to US 2006/0227434 A), and JP 2005-227426 A describe wide angle imaging lens devices having a relatively small number of lenses in the field mentioned above. JP 2002-244031 A, JP 2006-259704 A and JP 2006-292988 A describe wide angle lenses which have a four-lens configuration. JP 2005-227426 A describes a fisheye lens which has a four-lens or five-lens configuration.

However, in the lens described in JP 2002-244031 A, a refractive index of the first lens located on the most-object side is low, and negative powers of the first and second lenses are relatively low. Hence, it is hard to obtain an angle of view greater than 180 degrees, and recent demand of an increase in angle of view can not be satisfied. In the lens described in JP 2006-259704 A and JP 2006-292988 A, angle of views of them are in the range of 140 to 165 degrees and around 160 degrees, respectively, and recent demand of an increase in angle of view can not be satisfied.

In the lens described in JP 2005-227426 A, although its angle of view is greater than 180 degrees, there is a room for improvement in optical performance. In this lens, when the lens is estimated based on a stereographic projection, distortion rapidly increases toward a negative side in the area where a half angle of view is greater than 80 degrees. Thus, an image in the most peripheral portion is shrunken and is formed as a small image.

SUMMARY OF THE INVENTION

The invention has been made in view of the above circumstances, provides an ultra wide-angle imaging lens device capable of securing good optical performance while having a small size and an ultra wide-angle of view, and an imaging apparatus having the ultra wide-angle imaging lens device.

According to an aspect of the invention, an ultra wide-angle imaging lens device includes, in order from an object side, a negative first lens, a negative second lens, a positive third lens, a stop and a positive fourth lens. The first lens has a meniscus shape with a convex surface directed to the object side. The second lens has a concave surface directed to an image side and has at least one aspheric surface. The third lens has a convex surface directed to the object side and has at least one aspheric surface. The fourth lens has a convex surface directed to the image side and has at least one aspheric surface. The following conditional expression (1) is satisfied:

$$-3.2 < L/f_{34} < 3.2 \tag{1}$$

where L denotes a distance on an optical axis from an object side surface of the first lens to an image formation surface, and $f_{34}$ denotes a composite focal length of the third and fourth lenses.

Also, when L is calculated, an air-equivalent distance is used as a distance (a back focal length) from an image-side surface of the fourth lens to the image formation surface. For example, when an optical member such as a filter exists from the image side surface of the fourth lens to an image formation surface, L is calculated by converting the optical member into an air-equivalent length.

It is preferable that the following conditional expressions (2) and (3) are satisfied:

$$0.18 < d_2/L < 0.30 \tag{2}$$

$$d_4/L < 0.10 \tag{3}$$

where $d_2$ denotes an on-axis space between the first lens and the second lens, and $d_4$ denotes an on-axis space between the second lens and the third lens.

Also, it is preferable that the following conditional expression (4) is satisfied:

$$N_1 > 1.7 \tag{4}$$

where $N_1$ denotes a refractive index of the first lens at the e-line.

Also it is preferable that the following conditional expression (5) is satisfied:

$$0.17 < d_5/L < 0.30 \tag{5}$$

where $d_5$ denotes a thickness of the third lens on the optical axis.

Also, it is preferable that the following conditional expressions (6) to (8) are satisfied:

$$-0.22 < f_2/L < -0.08 \tag{6}$$

$$0.10 < f_3/L < 0.25 \tag{7}$$

$$0.10 < f_4/L < 0.20 \tag{8}$$

where $f_2$ denotes a focal length of the second lens, $f_3$ denotes a focal length of the third lens, and $f_4$ denotes a focal length of the fourth lens.

Also, it is preferable that the following conditional expressions (9) to (12) are satisfied:

$$v_1 \geq 40 \tag{9}$$

$$v_2 \geq 50 \tag{10}$$

$$v_3 \leq 40 \tag{11}$$

$$v_4 \geq 50 \tag{12}$$

where $v_1$ denotes an Abbe number of the first lens at the d-line, $v_2$ denotes an Abbe number of the second lens at the d-line, $v_3$ denotes an Abbe number of the third lens at the d-line, and $v_4$ denotes an Abbe number of the fourth lens at the d-line.

Also, it is preferable that all of the second lens, the third lens, and the fourth lens are made of plastic.

Also, it is preferable that the following conditional expression (13) is satisfied:

$$da/L<0.02 \qquad (13),$$

where da denotes an on-axis space between the stop and the fourth lens.

Also, in any of the above configurations, an angle of view of the ultra wide-angle imaging lens device may be greater than 180 degrees. Alternatively, the angle of view of the ultra wide-angle imaging lens device may be less than 180 degrees.

According to another aspect of the invention, an imaging apparatus includes the ultra of the wide-angle imaging lens device of any one of the above configurations, and an imaging device that converts an optical image formed by the ultra wide-angle imaging lens device into an electric signal.

In the conditional expressions (9) to (12), the d-line (587.6 nm in wavelength) is set as a reference wavelength. In the conditional expressions except for the conditional expressions (9) to (12), the e-line (546.07 nm in wavelength) is set as a reference wavelength.

According to the invention, although the ultra wide-angle imaging lens device has a small number of lenses, that is, four, since the shapes and refractive indices of the respective lenses are set appropriately and the imaging lens device is configured to satisfy the conditional expression (1), it is possible to provide the ultra wide-angle imaging lens device, which is compact and has a good optical performance while having an ultra wide-angle of view, and an imaging apparatus having the ultra wide-angle imaging lens device.

BRIEF DESCRIPTION OF THE DRAWINGS

FIG. 11 is a diagram showing various aberrations of the ultra wide-angle imaging lens device according to Example 4 of the invention.

DETAILED DESCRIPTION OF EMBODIMENTS OF THE INVENTION

Hereinafter, embodiments of the invention will be described in detail with reference to the drawings. First, referring to FIG. 1, a typical configuration of an ultra wide-angle imaging lens device according to the embodiment of the invention will be described and then, an imaging apparatus of the embodiment will be described.

Figure 1:
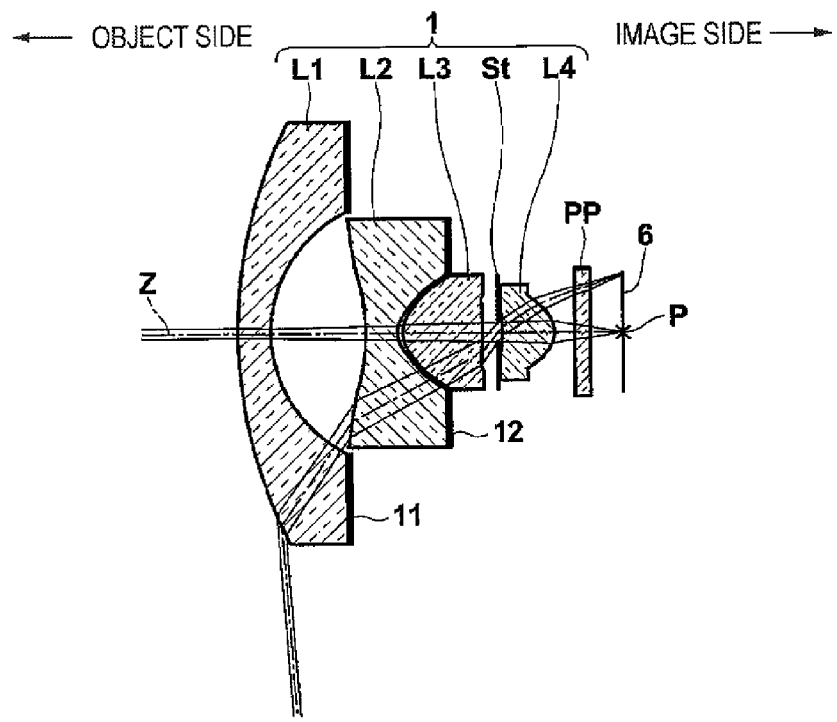
FIG. 1 is an optical path diagram showing an ultra wide-angle imaging lens device according to one embodiment of the invention.

FIG. 1 illustrates a lens section view of an ultra wide-angle imaging lens device 1 according to the embodiment of the invention. Also, the exemplary configuration shown in FIG. 1 corresponds to the lens configuration of Example 1 which will be described later. FIG. 1 shows on-axis rays and most off-axis rays. As can be seen from FIG. 1, the lens device of this embodiment is an ultra wide-angle lens device having the entire angle of view greater than 180 degrees.

In the ultra wide-angle imaging lens device 1, there are arranged, along an optical axis Z in order from an object side: a negative first lens L1 formed of a meniscus lens having a convex surface directed to the object side; a negative second lens L2 having a concave surface directed to an image side and having at least one aspheric surface; a positive third lens L3 having a convex surface directed to the object side and having at least one aspheric surface; an aperture diaphragm St; and a positive fourth lens L4 having a convex surface directed to the image side and having at least one aspheric surface.

In consideration of the case where the ultra wide-angle imaging lens device 1 is applied to the imaging apparatus, FIG. 1 shows an imaging device 6 disposed on the image formation surface including an image formation position P of the ultra wide-angle imaging lens device 1. The imaging device 6 converts an optical image formed by the ultra wide-angle imaging lens device 1 into an electric signal, and includes, for example, a CCD image sensor or the like.

Also, when the lens device is applied to the imaging apparatus, it is preferred that, between the fourth lens L4 and the image formation surface, a cover glass, a low pass filter, an infrared cut filter, or the like is disposed in accordance with the configuration of a camera on which the lens device is mounted. FIG. 1 shows an example in which an optical member PP having a parallel flat-plate shape and serving as any one of the components mentioned above is disposed.

Next, a specific configuration of the ultra wide-angle imaging lens device 1 and the effects and advantages thereof will be described. The first lens L1 disposed on the most-object side is formed of the negative meniscus lens having the convex surface directed to the object side. Thus, it is possible to obtain rays incident at a large angle on the convex surface, on the object side, of the first lens, and to increase an angle of view. Also, it is possible to decrease Petzval sum. Therefore, it becomes relatively easy to correct field curvature in the whole wide picture plane.

Also, the second lens L2 is formed of the negative lens. Thus, the first lens L1 and the second lens L2 can share a negative refractive power required for the whole system. Therefore, it is advantageous to correct aberrations. Particularly, as shown in the example of FIG. 1, when the second lens L2 is formed to have the biconcave shape, the second lens L2 can be configured to have a strong negative refractive power as compared with the first lens L1 having a refractive power, which is not so strong, and having a meniscus shape. Thus, it is possible to secure a negative refractive power required for the whole system. Also, an image-side surface of the second lens L2 is formed of a concave surface. Thereby, it is possible to lead off-axis rays, which are incident at a large angle, to a subsequent positive lens while suppressing aberrations to be as small as possible. Also, the second lens L2 is formed of an aspheric lens. Thereby, it is possible to perform good correction.

Also, not only the negative second lens L2 but also the positive third lens L3 and positive fourth lens L4 are formed of aspheric lenses. Thereby, it is possible to perform good correction.

In the ultra wide-angle imaging lens device 1, the following conditional expression (1) is satisfied:

$$-3.2 < L/f_{34} < 3.2 \tag{1}$$

where L denotes a distance on an optical axis from the object-side surface of the first lens L1 to the image formation surface, and $f_{34}$ denotes a composite focal length of the third lens L3 and the fourth lens L4. Here, with respect to L, a part of a back focus is an air-equivalent distance.

The conditional expression (1) defines a ratio of the composite focal length of the two lenses between which the aperture diaphragm St is disposed to the distance from the first lens L1 to the image surface. If $L/f_{34}$ exceeds the upper limit of the conditional expression (1), a power of the third lens L3 becomes weak, and so is insufficient to correct lateral chromatic aberration, or a power of the fourth lens L4 decreases, and so is insufficient to correct field curvature and coma aberration. Alternatively, if $L/f_{34}$ exceeds the upper limit of the conditional expression (1) but the powers of the third lens L3 and the fourth lens L4 are not weak, the third lens L3 and the fourth lens L4 become too close to each other, and thus it is difficult to arrange those lenses L3 and L4.

If $L/f_{34}$ falls below the lower limit of the conditional expression (1), the power of the third lens L3 increases, and lateral chromatic aberration is excessive, or the power of the fourth lens L4 increases, and so it is difficult to correct field curvature and coma aberration. Alternatively, if $L/f_{34}$ falls below the lower limit of the conditional expression (1) but the powers of the third lens L3 and the fourth lens L4 is not strong, the third lens L3 and the fourth lens L4 are too far from each other, and thus the size of the lens system increases.

Also, in the ultra wide-angle imaging lens device 1, it is preferred that the following conditional expressions (2) to (3) be satisfied:

$$0.18 < d_2/L < 0.30 \tag{2}$$

$$d_4/L < 0.10 \tag{3}$$

where $d_2$ denotes an on-axis space between the first lens L1 and the second lens L2, and $d_4$ denotes an on-axis space between the second lens L2 and the third lens L3.

If $d_2$ exceeds the upper limit of the conditional expression (2), an effective radius of the image-side surface of the first lens L1 increases, and approaches a radius of curvature thereof. Thus, it is difficult to process the lens, and a total lens length increases. If $d_2$ falls below the lower limit of the conditional expression (2) and it is attempted to secure a proper power for the first lens L1, the image-side surface of the first lens L1 interferes with the object-side surface of the second lens L2, and it is hard to secure the required effective radius.

If $d_4/L$ exceeds the upper limit of the conditional expression (3), it is difficult to well correct distortion while well suppressing lateral chromatic aberration, and the total lens length increases. Also, the lower limit of the conditional expression (3) may be determined so long as the second lens L2 and the third lens L3 are not in contact with each other within the effective diameter.

Furthermore, if the lens device is configured to satisfy the following conditional expression (3-1), it becomes easier to correct both of lateral chromatic aberration and distortion.

$$d_4/L < 0.07 \tag{3-1}$$

Also, in the ultra wide-angle imaging lens device 1, it is preferred that the following conditional expression (4) is satisfied:

$$N_1 > 1.7 \tag{4}$$

where $N_1$ denotes a refractive index of the first lens L1 at the e-line.

If $N_1$ falls below the lower limit of the conditional expression (4), a radius of curvature of the object-side surface of the first lens L1 increases in order to obtain a power required for the first lens L1, and a radius of curvature of the image-side surface thereof decreases. However, when the radius of curvature of the object-side surface increases, an angle at which rays of a peripheral image are refracted on the object-side surface increases. Thus, it is difficult to well correct distortion. When a radius of curvature of the image-side surface decreases, the radius of curvature thereof extremely approaches to the effective radius thereof. Thus, it is difficult to process the lens. Also, since a depth (a length from a lens periphery to a lens center in the optical-axis direction) of the image-side surface also increases, a distance between the image side surface of the first lens L1 and the object side surface of the second lens L2 increases, and a total lens length increases. This configuration is disadvantageous in downsizing.

Also, in the ultra wide-angle imaging lens device 1, it is preferred that the following conditional expression (5) be satisfied:

$$0.17 < d_5/L < 0.30 \tag{5}$$

where $d_5$ denotes a thickness of the third lens L3 on the optical axis.

If $d_5/L$ exceeds the upper limit of the conditional expression (5), a total lens length increases. If $d_5/L$ falls below the lower limit of the conditional expression (5) and it is attempted to obtain a positive power required for the third lens L3, the object-side surface and image-side surface of the third lens L3 are too close to each other outside the effective diameter. Thus, it is difficult to process the lens.

Also, in the ultra wide-angle imaging lens device 1, it is preferred that the following conditional expressions (6) to (8) are satisfied:

$$-0.22 < f_2/L < -0.08 \tag{6}$$

$$0.10 < f_3/L < 0.25 \tag{7}$$

$$0.10 < f_4/L < 0.20 \tag{8}$$

where $f_2$ denotes a focal length of the second lens L2, $f_3$ denotes a focal length of the third lens L3, and $f_4$ denotes a focal length of the fourth lens L4.

If $f_2/L$ exceeds the upper limit of the conditional expression (6), refraction of rays in the second lens L2 greatly increases. Thus, it is difficult to well correct distortion and coma aberration. Also, sensitivity of the second lens L2 to a positional error increases. Thus, it is difficult to stably secure performance at the time of production of the lens device. If $f_2/L$ falls below the lower limit of the conditional expression (6), a large negative power is required by the first lens L1. Thus, a radius of curvature of the object side surface of the first lens L1 should increase, and it becomes necessary to decrease a radius of curvature of the image side surface of the first lens L1. Therefore, it is difficult to well correct distortion, and workability of the first lens L1 is deteriorated.

If $f_3/L$ exceeds the upper limit of the conditional expression (7), correction of lateral chromatic aberration is insufficient, and thus a resolution power of the lens deteriorates. If $f_3/L$ falls below the lower limit of the conditional expression (7), refraction of rays in the third lens L3 becomes too large, and thus it is difficult to well correct coma aberration. Also, sensitivity of the third lens L3 to a positional error increases, and thus it is difficult to stably secure performance at the time of production of the lens device.

When a lens closer to the object side than the aperture diaphragm St corrects lateral chromatic aberration, axial chromatic aberration deteriorates. However, if a positive power of the lens closer to the image side than the aperture diaphragm St is properly set not to exceed the upper limit of the conditional expression (8), the tendency to deteriorate axial chromatic aberration is suppressed. Thus, it is possible to adjust axial chromatic aberration to be in the practical allowable range.

If $f_4/L$ exceeds the upper limit of the conditional expression (8), a ratio of a positive power of the lens closer to the image side than the aperture diaphragm St to a power of the whole lens system decreases, and thus axial chromatic aberration generated in positions closer to the object side than the aperture diaphragm St becomes too large. If $f_4/L$ falls below the lower limit of the conditional expression (8), a radius of curvature of the fourth lens L4 decreases. Thus, it is difficult to process the lens, and a back focal length thereof becomes too short.

Also, in the ultra wide-angle imaging lens device 1, it is preferred that the following conditional expressions (9) to (12) be satisfied:

$$v_1 \geq 40 \quad (9)$$

$$v_2 \geq 50 \quad (10)$$

$$v_3 \leq 40 \quad (11)$$

$$v_4 \geq 50 \quad (12)$$

where $v_1$ denotes an Abbe number of the first lens L1 at the d-line, $v_2$ denotes an Abbe number of the second lens L2 at the d-line, $v_3$ denotes an Abbe number of the third lens L3 at the d-line, and $v_4$ denotes an Abbe number of the fourth lens L4 at the d-line.

Also, to further improve correction effect in lateral chromatic aberration, it is more preferred that the following conditional expression (11-1) is satisfied:

$$v_3 \leq 29 \quad (11\text{-}1)$$

Also, in the ultra wide-angle imaging lens device 1, it is preferred that the following conditional expression (13) is satisfied:

$$da/L < 0.02 \quad (13),$$

where da denotes an on-axis space between the aperture diaphragm and the fourth lens L4.

Furthermore, in the ultra wide-angle imaging lens device 1, it is preferred that both surfaces of each of the second lens L2, the third lens L3, and the fourth lens L4 are aspheric. In this case, it is advantageous to correct aberrations.

With regard to lens materials, the first lens L1 is a lens closest to the object side. Therefore, if the lens device is used in severe environment like an on-vehicle camera, it is preferred to use a material strong in a resistance against surface abrasion caused by rainstorm, a resistance against temperature variation caused by direct rays, and a resistance against chemicals such as grease and cleanser, that is, a water resistance, a weather resistance, an acid resistance, and a chemical resistance. Also, it is preferred that the material of the first lens L1 is hard and is not fragile, such as glass or transparent ceramic. Ceramic has higher stiffness and heat resistance than normal glass.

To the contrary, it is preferred that the second lens L2, the third lens L3, and the fourth lens L4 are made of plastic. By using plastic as materials of them, it is possible to form an aspheric surface shape with high accuracy, and it is also possible to provide a lightweight and low-cost lens.

If the plastic material has high water-absorption property, its refractive index is changed by entrance and exit of moisture, and its geometry is also changed, thereby having an adverse effect on optical performance. However, if materials having quite small water-absorption property, for example, the second lens L2 and the fourth lens L4 use polyolefin based plastic and the third lens L3 uses polycarbonate or PET based plastic, it is possible to minimize performance deterioration caused by water-absorption.

In the ultra wide-angle imaging lens device 1, there is a concern that rays passing through out of the effective diameter reach the image surface as stray light and forms a ghost image. Thus, it is preferred to shield the stray light by providing a light shielding member. In the example shown in FIG. 1, there are provide light shielding members 11 and 12 in a portion outside the effective diameter of the first lens L1 on the image side and in a portion outside the effective diameter of the second lens L2 on the image side. Examples of the shielding members 11 and 12 include an opaque coating material and an opaque plate member which are provided in the portions outside the effective diameter of the lenses. Alternatively, the stray light may be shielded by providing an opaque plate member on the optical path of the stray light. The shielding members for the purpose of this object may be disposed between other lenses, if necessary.

EXAMPLES

Hereinafter, numerical examples of the ultra wide-angle imaging lens device according to the invention will be described in detail.

Example 1

Table 1 shows lens data and various data of the ultra wide-angle imaging lens device according to Example 1. In the lens data of Table 1, a surface number represents i-th (i=1, 2, 3 . . . ) surface and sequentially increases as it gets closer to the image side with the assumption that a surface of a component closest to the object side is defined as a first surface. Also, it is noted that the lens data of Table 1 includes the aperture diaphragm St.

In Table 1, ri represents a radius of curvature of the i-th (i=1, 2, 3 . . . ) surface, and di represents a surface separation, on the optical axis Z, between the i-th (i=1, 2, 3 . . . ) surface and the (i+1)th surface. Also, Nej represents a refractive index, at the e-line (546.07 nm in wavelength), of j-th (j=1, 2, 3 . . . ) lens, and the lens number sequentially increases as it gets closer to the image side with the assumption that the lens closest to the object side is defined as a first lens. Also, vdj represents an Abbe number of the j-th lens at the d-line (587.6 nm in wavelength). In Table 1, units of the radius of curvature and the surface separation are mm. Also, it is assumed that if a surface is convex toward the object side, its radius of curvature takes a positive value and that if a surface is convex toward the image side, its radius of curvature takes a negative value.

In the various data of Table 1, f represents a focal length of the whole system, FNo. represents a F number, 2ω represents an entire angle of view, Bf represents a back focal length, L represents a distance from the object-side surface of the first lens L1 to the image formation surface on the optical axis Z, and IH represents an image height. In the various data of Table 1, a unit of 2ω is degree, and units of FNo. and 2ω are mm. Also, the reference signs in Table 1 have the same meaning as reference signs used in examples which will be described later.

In the lens data in Table 1, aspheric surfaces are represented by a sign "*" added to the surface numbers. The aspheric surfaces are defined by an aspheric surface expression shown in the following expression. Table 2 shows values of respective aspheric coefficients K and B3 to B20 of the aspheric surfaces. Also, the signs in Table 2 and the definition of the aspheric surfaces are the same in the examples which will be described later.

$$Z = \frac{\frac{Y^2}{R}}{1+\sqrt{\left(1-K\cdot\frac{Y^2}{R^2}\right)}} + \sum_{i=3}^{20} B_i Y^i$$

Z: depth of aspheric surface (a length of a perpendicular line dropped from a point having a height of Y on an aspheric surface down to a plane which is tangential to an aspheric surface apex and is perpendicular to the optical axis).

Y: height (a distance from the optical axis)

R: paraxial radius of curvature

K, Bi: aspheric surface coefficient (i=3 to 20)

Figure 2:
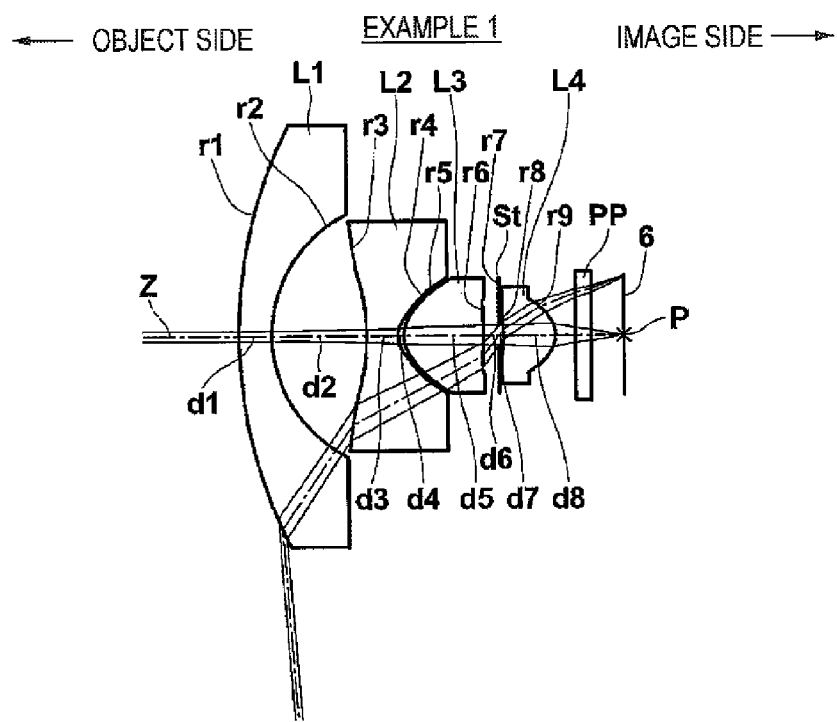
FIG. 2 is a section diagram showing the configuration of an ultra wide-angle imaging lens device according to Example 1 of the invention.

FIG. 2 is a section view illustrating the configuration of the lens device according to Example 1. The reference signs ri (i=1, 2, 3 . . . ) and di (i=1, 2, 3 . . . ) shown in FIG. 2 correspond to the reference signs ri and di in Table 1. FIG. 2 also shows the aperture diaphragm St and the optical member PP. FIG. 2 shows the example in which a member which has a parallel flat-plate shape, 0.5 mm in thickness, and 1.52 in refractive index at the e-line is used as an example of the optical member PP and is disposed between the fourth lens L4 and the image formation surface. FIG. 2 also shows the on-axis rays, the most-off-axis rays, and the image formation position P, and hatching is omitted for explanatory convenience. Basic configurations of the examples which will be described later are the same as illustrated in FIG. 2.

In Example 1, as lens materials, an optical glass is used in the first lens L1, a polyolefin based plastic is used in the second lens L2 and the fourth lens L4, and a PET based plastic is used in the third lens L3.

Example 2

Figure 3:
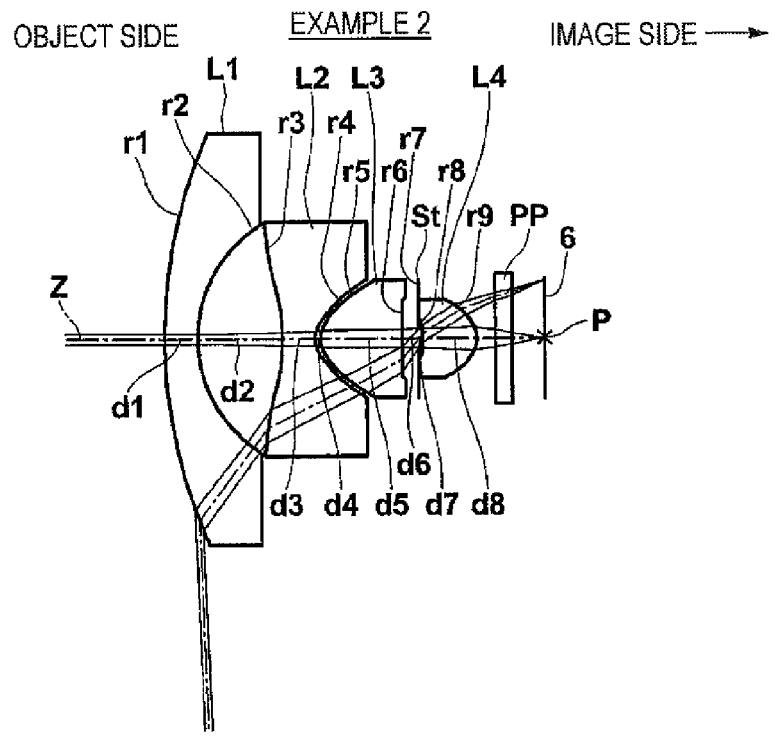
FIG. 3 is a section diagram showing the configuration of an ultra wide-angle imaging lens device according to Example 2 of the invention.

Table 3 shows lens data and various data of the ultra wide-angle imaging lens device according to Example 2. Table 4 shows coefficients of the aspheric surface expressions with regard to the respective aspheric surfaces. FIG. 3 is a section

TABLE 1

<Example 1> Lens Data

| SN | ri | di | Nej | νdj |
|---|---|---|---|---|
| 1 | 14.767 | 1.000 | 1.77621 | 49.6 |
| 2 | 4.258 | 2.941 | | |
| 3* | −92.102 | 1.000 | 1.53387 | 55.5 |
| 4* | 0.702 | 0.177 | | |
| 5* | 0.930 | 2.500 | 1.61126 | 26.9 |
| 6* | −17.466 | 0.498 | | |
| 7 (St) | ∞ | 0.139 | | |
| 8* | −3.603 | 1.650 | 1.53387 | 55.5 |
| 9* | −0.804 | | | |

Various Data

| | |
|---|---|
| f | 0.864 |
| FNo. | 2.8 |
| 2ω | 188.4 |
| Bf | 1.966 |
| L | 11.872 |
| IH | 1.841 |

SN: Surface Number
St: Aperture Diaphragm

TABLE 2

<Example 1> Aspheric Surface Coefficients

| | SN | | | | | |
|---|---|---|---|---|---|---|
| | 3 | 4 | 5 | 6 | 8 | 9 |
| K | 0 | 0 | 0 | 0 | 0 | 0 |
| B3 | −1.00091E−01 | −2.88398E−02 | −3.33577E−03 | 7.73927E−02 | 5.99846E−01 | 2.98701E−01 |
| B4 | 3.12815E−02 | −1.32276E−01 | 1.50798E−02 | −1.02482E−01 | −1.55960E+00 | −9.54574E−01 |
| B5 | 3.46205E−03 | −6.00550E−02 | −6.25030E−02 | −2.90508E−02 | −8.42876E+00 | 1.17675E+00 |
| B6 | −7.82053E−04 | 2.85820E−02 | −1.80211E−02 | 8.77596E−02 | 3.83696E+01 | −3.01697E−01 |
| B7 | −3.55572E−04 | 1.71448E−02 | 2.13582E−02 | 7.50999E−02 | −8.39518E+00 | −3.98392E−01 |
| B8 | −1.61685E−05 | 4.89817E−03 | 1.49229E−02 | −5.81042E−02 | −8.72088E+01 | −6.68661E−02 |
| B9 | 8.92670E−06 | 6.00245E−04 | −9.60795E−03 | −1.84879E−01 | −1.82107E+02 | 9.04612E−02 |
| B10 | 3.42193E−06 | −4.43144E−04 | −9.82640E−03 | −1.02949E−01 | 2.24899E+02 | 1.55029E−01 |
| B11 | 7.43909E−07 | −3.00732E−04 | 7.37080E−03 | 3.29035E−01 | 1.26020E+03 | 1.00862E−01 |
| B12 | −4.76767E−07 | −8.63145E−06 | 3.74407E−03 | 3.38901E−01 | −1.02924E+02 | 1.41883E−02 |
| B13 | 1.92303E−08 | 7.75019E−05 | 1.40137E−04 | −4.60584E−01 | −1.70858E+03 | −5.58423E−02 |
| B14 | 1.91125E−08 | 7.89848E−05 | −9.55989E−04 | −1.89351E−01 | −5.47369E+03 | −7.36630E−02 |
| B15 | 2.25693E−09 | 1.48800E−05 | −7.42557E−04 | 3.66585E−01 | −4.77280E+03 | −5.14865E−02 |
| B16 | −3.38346E−11 | −4.77245E−05 | −2.68059E−04 | −1.57543E−01 | 5.53602E+03 | −1.47972E−02 |
| B17 | −2.74327E−10 | −4.49353E−05 | 7.49012E−05 | −9.29469E−02 | 7.22097E+04 | 1.96487E−02 |
| B18 | −8.53985E−11 | −1.26803E−05 | 1.33027E−04 | 9.57050E−02 | −3.34383E+04 | 5.20588E−02 |
| B19 | −1.68834E−11 | 1.24922E−05 | 6.58204E−05 | 7.41520E−02 | −1.61187E+05 | 2.30762E−02 |
| B20 | 9.12719E−12 | 1.67241E−06 | −4.03394E−05 | −5.61145E−02 | 1.35858E+05 | −2.79446E−02 |

SN: Surface Number view illustrating the configuration of the lens device. In FIG. 3, the reference signs ri and di correspond to the reference signs ri and di in Table 3.

In Example 2, as lens materials, an optical glass is used in the first lens L1, a polyolefin based plastic is used in the second lens L2 and the fourth lens L4, and a PET based plastic is used in the third lens L3.

TABLE 3

<Example 2> Lens Data

| SN | ri | di | Nej | vdj |
|---|---|---|---|---|
| 1 | 15.552 | 1.000 | 1.77621 | 49.6 |
| 2 | 4.130 | 2.592 | | |
| 3* | −25.375 | 1.000 | 1.53387 | 55.5 |
| 4* | 0.660 | 0.184 | | |
| 5* | 0.834 | 2.500 | 1.61126 | 26.9 |
| 6* | −47.843 | 0.498 | | |
| 7 (St) | ∞ | 0.123 | | |
| 8* | −4.075 | 1.678 | 1.53387 | 55.5 |
| 9* | −0.794 | | | |

Various Data

| | |
|---|---|
| f | 0.862 |
| FNo. | 2.8 |
| 2ω | 184.6 |
| Bf | 1.884 |
| L | 11.457 |
| IH | 1.791 |

SN: Surface Number
St: Aperture Diaphragm

Example 3

Figure 4:
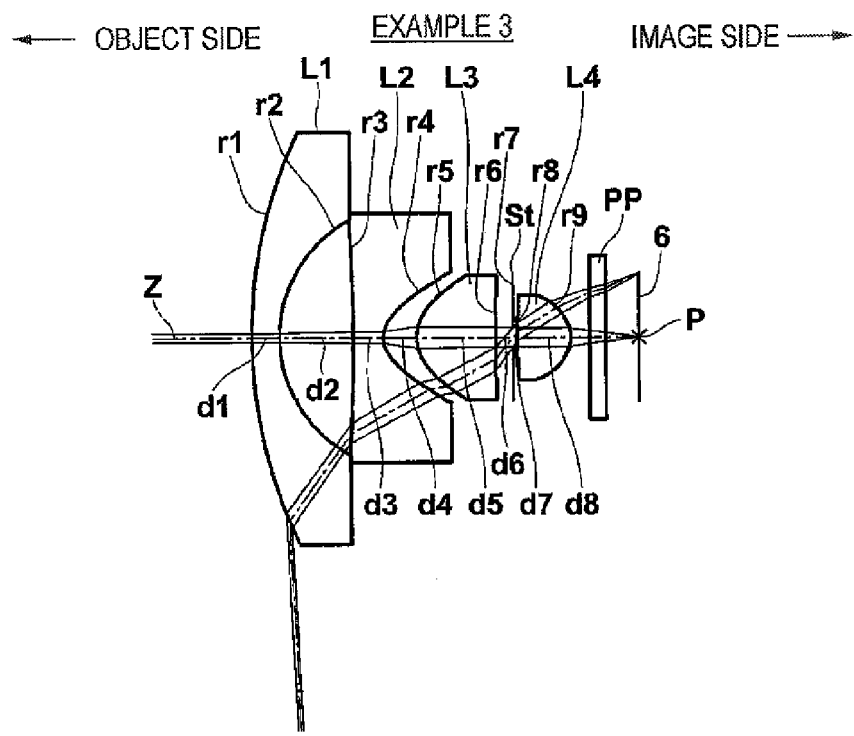
FIG. 4 is a section diagram showing the configuration of an ultra wide-angle imaging lens device according to Example 3 of the invention.

Table 5 shows lens data and various data of the ultra wide-angle imaging lens device according to Example 3. Table 6 shows coefficients of the aspheric surface expressions with regard to the respective aspheric surfaces. FIG. 4 is a section view illustrating the configuration of the lens device. In FIG. 4, the reference signs ri and di correspond to the reference signs ri and di in Table 5.

In Example 3, as lens materials, an optical glass is used in the first lens L1, a polyolefin based plastic is used in the second lens L2 and the fourth lens L4, and a polycarbonate based plastic is used in the third lens L3.

TABLE 5

<Example 3> Lens Data

| SN | ri | di | Nej | vdj |
|---|---|---|---|---|
| 1 | 14.630 | 0.842 | 1.77621 | 49.6 |
| 2 | 4.063 | 2.252 | | |
| 3* | 7.864 | 0.927 | 1.53387 | 55.5 |
| 4* | 0.720 | 1.024 | | |
| 5* | 1.258 | 2.443 | 1.58820 | 30.3 |
| 6* | −10.224 | 0.525 | | |
| 7 (St) | ∞ | 0.138 | | |
| 8* | −4.547 | 1.634 | 1.51222 | 56.2 |
| 9* | −1.051 | | | |

TABLE 4

<Example 2> Aspheric Surface Coefficients

| | SN | | | | | |
|---|---|---|---|---|---|---|
| | 3 | 4 | 5 | 6 | 8 | 9 |
| K | 0 | 0 | 0 | 0 | 0 | 0 |
| B3 | −9.17825E−02 | −7.97468E−02 | −5.38383E−02 | 8.69608E−02 | 4.85902E−01 | 2.09144E−01 |
| B4 | 3.09901E−02 | −1.08739E−01 | 6.23631E−02 | −9.18907E−02 | −1.83284E+00 | −6.62347E−01 |
| B5 | 3.21088E−03 | −4.43399E−02 | −7.29538E−02 | −3.30869E−02 | −5.11567E+00 | 8.31738E−01 |
| B6 | −8.31640E−04 | 2.66524E−02 | −2.00005E−02 | 7.09901E−02 | 3.63195E+01 | −2.72872E−01 |
| B7 | −3.57454E−04 | 1.32450E−02 | 2.23146E−02 | 6.25331E−02 | −2.24587E+01 | −2.70600E−01 |
| B8 | −1.46249E−05 | 2.75447E−03 | 1.54180E−02 | −6.01288E−02 | −9.12056E+01 | −3.31081E−02 |
| B9 | 9.78310E−06 | 9.01474E−05 | −9.66280E−03 | −1.79082E−01 | −1.45281E+02 | 5.88618E−02 |
| B10 | 3.66396E−06 | −4.29660E−04 | −1.00315E−02 | −9.48811E−02 | 2.74445E+02 | 1.32950E−01 |
| B11 | 7.90177E−07 | −1.76209E−04 | 7.21639E−03 | 3.34753E−01 | 1.25628E+03 | 1.02052E−01 |
| B12 | −4.73316E−07 | 8.22230E−05 | 3.66901E−03 | 3.42755E−01 | −1.96908E+02 | 1.94312E−02 |
| B13 | 1.74484E−08 | 1.19838E−04 | 1.17904E−04 | −4.59475E−01 | −1.84433E+03 | −5.50555E−02 |
| B14 | 1.79798E−08 | 9.24660E−05 | −9.54894E−04 | −1.90652E−01 | −5.60965E+03 | −7.61353E−02 |
| B15 | 1.85371E−09 | 1.49612E−05 | −7.32338E−04 | 3.62890E−01 | −4.82009E+03 | −5.49690E−02 |
| B16 | −1.39229E−10 | −5.13622E−05 | −2.58446E−04 | −1.60076E−01 | 5.67029E+03 | −1.75692E−02 |
| B17 | −2.93311E−10 | −4.82654E−05 | 8.09885E−05 | −9.46167E−02 | 7.25164E+04 | 1.83232E−02 |
| B18 | −8.58389E−11 | −1.43541E−05 | 1.35504E−04 | 9.50329E−02 | −3.36076E+04 | 5.17826E−02 |
| B19 | −1.53131E−11 | 1.24004E−05 | 6.57053E−05 | 7.51560E−02 | −1.60484E+05 | 2.31578E−02 |
| B20 | 1.00158E−11 | 2.69280E−06 | −4.20079E−05 | −5.55716E−02 | 1.36759E+05 | −2.79145E−02 |

SN: Surface Number

TABLE 5-continued

Various Data

| | |
|---|---|
| f | 1.000 |
| FNo. | 2.8 |
| 2ω | 185.6 |
| Bf | 2.101 |
| L | 11.886 |
| IH | 1.945 |

SN: Surface Number
St: Aperture Diaphragm

TABLE 6

<Example 3> Aspheric Surface Coefficients

| | SN | | | | | |
|---|---|---|---|---|---|---|
| | 3 | 4 | 5 | 6 | 8 | 9 |
| K | 0 | 0 | 0 | 0 | 0 | 0 |
| B3 | −8.08513E−02 | −4.79288E−02 | 4.75980E−03 | 5.72185E−02 | 8.01162E−01 | 6.82899E−02 |
| B4 | 2.32526E−02 | −4.81789E−02 | 2.86619E−02 | −4.72466E−02 | −3.28563E+00 | −3.69659E−01 |
| B5 | 1.78162E−03 | −3.42993E−02 | −3.45218E−02 | 1.28676E−02 | −1.89368E+00 | 5.76137E−01 |
| B6 | −6.98727E−04 | 1.98141E−02 | −3.95093E−03 | 2.61953E−02 | 2.88143E+01 | −2.14599E−01 |
| B7 | −2.14530E−04 | 1.05273E−02 | 1.65003E−02 | −4.67907E−03 | −1.56956E+01 | −1.76308E−01 |
| B8 | −3.02394E−06 | 2.71957E−03 | 8.61336E−03 | −4.20363E−02 | −6.22820E+01 | −3.90584E−02 |
| B9 | 7.17478E−06 | −6.19488E−05 | −7.43114E−03 | −7.24998E−02 | −9.98462E+01 | 4.28304E−02 |
| B10 | 2.39851E−06 | −5.09887E−04 | −6.68072E−03 | −1.91469E−02 | 1.66773E+02 | 8.21644E−02 |
| B11 | 4.00640E−07 | −3.95297E−04 | 3.81392E−03 | 1.86729E−01 | 3.61940E+02 | 5.60823E−02 |
| B12 | −2.87732E−07 | −2.18230E−04 | 1.86542E−03 | 1.65966E−01 | 1.63478E+02 | 4.23714E−03 |
| B13 | −2.70296E−09 | −1.27236E−04 | 4.79915E−05 | −2.55803E−01 | −1.52123E+02 | −3.39919E−02 |
| B14 | 6.08840E−09 | −5.44755E−05 | −4.33723E−04 | −1.16732E−01 | −5.80563E+02 | −3.83166E−02 |
| B15 | 5.78016E−10 | −7.16986E−06 | −3.05822E−04 | 1.70368E−01 | −1.21770E+03 | −2.26783E−02 |
| B16 | 3.56911E−11 | 1.06769E−05 | −9.23618E−05 | −5.65246E−02 | −2.55618E+03 | −4.34255E−03 |
| B17 | −4.97766E−11 | 1.07178E−05 | 3.61396E−05 | −2.74659E−02 | −4.17621E+03 | 9.29047E−03 |
| B18 | −9.25262E−12 | 6.26507E−06 | 5.21479E−05 | 4.18259E−02 | −5.16241E+03 | 2.00240E−02 |
| B19 | −2.05161E−12 | 3.93290E−06 | 2.23224E−05 | 2.72882E−02 | 7.75216E+04 | 7.68691E−03 |
| B20 | 1.50418E−12 | −2.99403E−06 | −1.47108E−05 | −2.48867E−02 | −7.30839E+04 | −1.01512E−02 |

SN: Surface Number

Example 4

Figure 5:
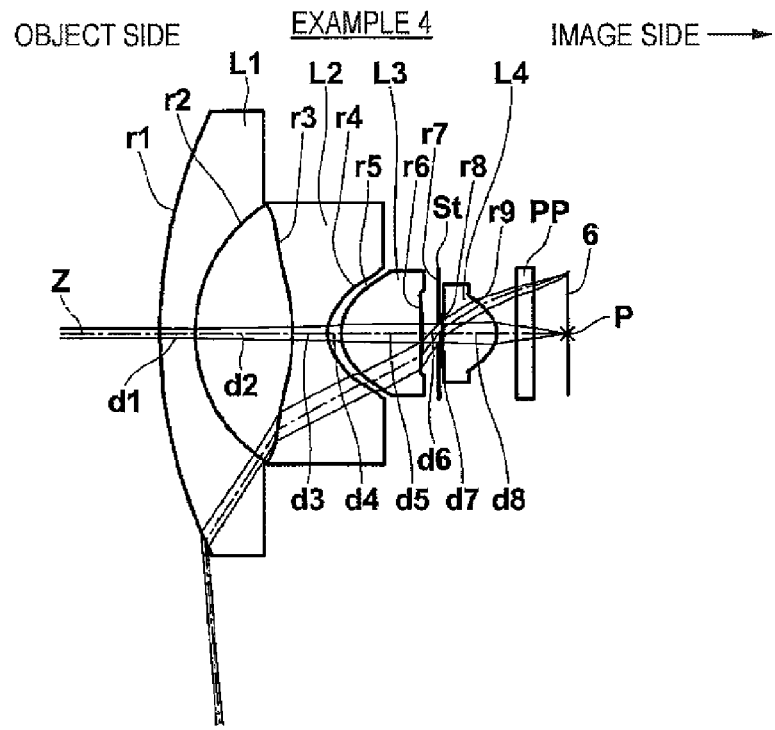
FIG. 5 is a section diagram showing the configuration of an ultra wide-angle imaging lens device according to Example 4 of the invention.

Table 7 shows lens data and various data of the ultra wide-angle imaging lens device according to Example 4. Table 8 shows coefficients of the aspheric surface expressions with regard to the respective aspheric surfaces. FIG. 5 is a section view illustrating the configuration of the lens device. In FIG. 5, the reference signs ri and di correspond to the reference signs ri and di in Table 7.

In Example 4, as lens materials, an optical glass is used in the first lens L1, a polyolefin based plastic is used in the second lens L2 and the fourth lens L4, and a polycarbonate based plastic is used in the third lens L3.

TABLE 7

<Example 4> Lens Data

| SN | ri | di | Nej | vdj |
|---|---|---|---|---|
| 1 | 15.281 | 1.100 | 1.77621 | 49.6 |
| 2 | 4.670 | 2.960 | | |
| 3* | 32.289 | 1.100 | 1.53387 | 55.5 |
| 4* | 1.102 | 0.420 | | |
| 5* | 1.532 | 2.500 | 1.58820 | 30.3 |
| 6* | −16.574 | 0.520 | | |
| 7 (St) | ∞ | 0.120 | | |

TABLE 7-continued

| 8* | −2.653 | 1.650 | 1.53387 | 55.5 |
|---|---|---|---|---|
| 9* | −0.782 | | | |

Various Data

| | |
|---|---|
| f | 0.904 |
| FNo. | 2.8 |
| 2ω | 189.0 |
| Bf | 2.077 |
| L | 12.447 |
| IH | 1.841 |

SN: Surface Number
St: Aperture Diaphragm

TABLE 8

<Example 4> Aspheric Surface Coefficients

| | SN | | | | | |
|---|---|---|---|---|---|---|
| | 3 | 4 | 5 | 6 | 8 | 9 |
| K | 0 | 0 | 0 | 0 | 0 | 0 |
| B3 | −1.06517E−01 | 9.60762E−02 | 1.27455E−01 | 3.93160E−02 | 6.42145E−01 | 3.82780E−01 |
| B4 | 3.09224E−02 | −8.08480E−02 | −1.57017E−02 | −8.75365E−02 | −1.97564E+00 | −1.17599E+00 |
| B5 | 3.48350E−03 | −7.27980E−02 | −6.52932E−02 | −1.64247E−02 | −8.55581E+00 | 1.46874E+00 |
| B6 | −7.44198E−04 | 1.61566E−02 | −8.62592E−03 | 1.03308E−01 | 4.29218E+01 | −4.65975E−01 |
| B7 | −3.32596E−04 | 1.42982E−02 | 2.54572E−02 | 9.11180E−02 | −1.17330E+00 | −4.55262E−01 |
| B8 | −1.45702E−05 | 6.00426E−03 | 1.55299E−02 | −7.12989E−02 | −1.14277E+02 | −3.20664E−02 |
| B9 | 6.14082E−06 | 1.76930E−03 | −1.00859E−02 | −2.30691E−01 | −2.22881E+02 | 1.87953E−01 |
| B10 | 3.08388E−06 | 3.47283E−04 | −1.05487E−02 | −1.46620E−01 | 2.75555E+02 | 1.79082E−01 |
| B11 | 7.77745E−07 | −9.95317E−06 | 6.99516E−03 | 3.40210E−01 | 1.22267E+03 | 5.03447E−02 |
| B12 | −4.60858E−07 | 1.67461E−04 | 3.51030E−03 | 3.62689E−01 | −1.27780E+02 | −2.96918E−02 |
| B13 | 2.41190E−08 | −1.17833E−04 | 3.54268E−05 | −4.26665E−01 | −1.43553E+03 | −7.18695E−02 |
| B14 | 2.00469E−08 | −1.22881E−04 | −9.76497E−04 | −1.58270E−01 | −4.23511E+03 | −6.84219E−02 |
| B15 | 2.39628E−09 | −9.96249E−05 | −7.23960E−04 | 3.71186E−01 | −2.40092E+03 | −3.67171E−02 |
| B16 | −3.97702E−11 | −5.96539E−05 | −1.72273E−04 | −1.73100E−01 | 4.02468E+03 | −3.34336E−03 |
| B17 | −2.84678E−10 | −5.93834E−06 | 7.76852E−05 | −1.15261E−01 | 4.90985E+04 | 2.47528E−02 |
| B18 | −9.16966E−11 | 1.59387E−05 | 1.22515E−04 | 7.93359E−02 | −1.02215E+04 | 5.22487E−02 |
| B19 | −1.85183E−11 | 1.75148E−05 | 5.74770E−05 | 7.46849E−02 | −1.61170E+05 | 2.07223E−02 |
| B20 | 9.34503E−12 | −5.71347E−06 | −3.76826E−05 | −4.44280E−02 | 1.36337E+05 | −3.08881E−02 |

SN: Surface Number

Example 5

Figure 6:
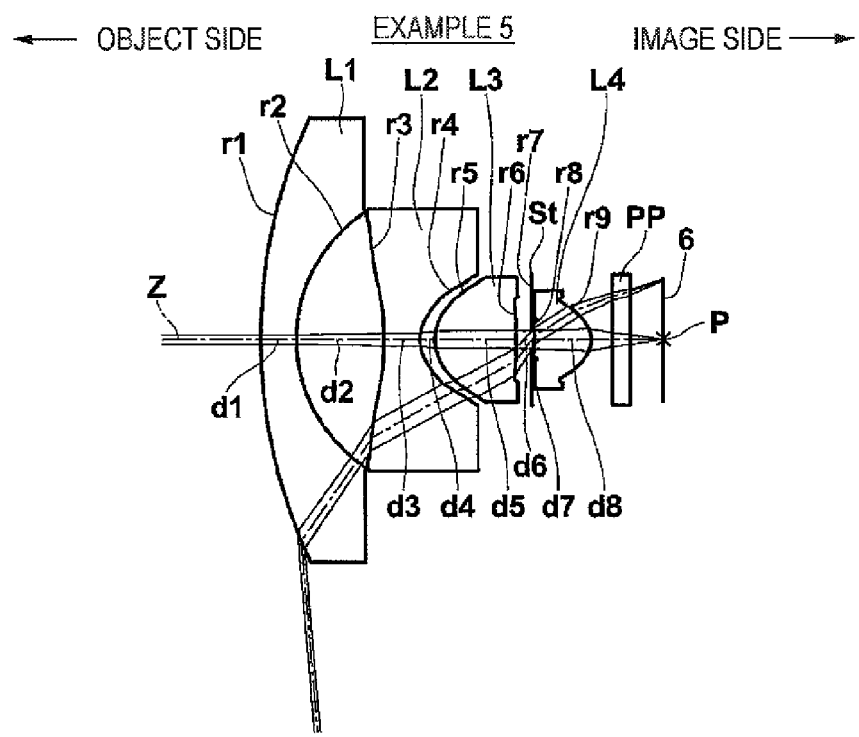
FIG. 6 is a section diagram showing the configuration of an ultra wide-angle imaging lens device according to Example 5 of the invention.

Table 9 shows lens data and various data of the ultra wide-angle imaging lens device according to Example 5. Table 10 shows coefficients of the aspheric surface expressions with regard to the respective aspheric surfaces. FIG. 6 is a section view illustrating the configuration of the lens device. In FIG. 6, the reference signs ri and di correspond to the reference signs ri and di in Table 9.

In Example 5, as lens materials, an optical glass is used in the first lens L1, a polyolefin based plastic is used in the second lens L2 and the fourth lens L4, and a polycarbonate based plastic is used in the third lens L3.

TABLE 9

<Example 5> Lens Data

| SN | ri | di | Nej | νdj |
|---|---|---|---|---|
| 1 | 15.876 | 1.100 | 1.77621 | 49.6 |
| 2 | 4.670 | 2.680 | | |
| 3* | 20.053 | 1.100 | 1.53387 | 55.5 |
| 4* | 1.199 | 0.470 | | |
| 5* | 1.658 | 2.500 | 1.58820 | 30.3 |

TABLE 9-continued

| 6* | −58.145 | 0.510 | | |
|---|---|---|---|---|
| 7 (St) | ∞ | 0.060 | | |
| 8* | −2.438 | 1.740 | 1.53387 | 55.5 |
| 9* | −0.761 | | | |

| Various Data | |
|---|---|
| f | 0.891 |
| FNo. | 2.8 |
| 2ω | 189.2 |
| Bf | 2.083 |
| L | 12.243 |
| IH | 1.841 |

SN: Surface Number
St: Aperture Diaphragm

TABLE 10

<Example 5> Aspheric Surface Coefficients

| | SN | | | | | |
|---|---|---|---|---|---|---|
| | 3 | 4 | 5 | 6 | 8 | 9 |
| K | 0 | 0 | 0 | 0 | 0 | 0 |
| B3 | −1.09520E−01 | 1.09443E−01 | 1.49890E−01 | 1.87242E−02 | 6.11230E−01 | 4.05743E−01 |
| B4 | 3.13199E−02 | −7.62041E−02 | −2.56570E−02 | −8.50562E−02 | −1.92731E+00 | −1.18079E+00 |
| B5 | 3.64130E−03 | −7.26176E−02 | −6.38863E−02 | −1.39180E−02 | −7.73517E+00 | 1.46867E+00 |
| B6 | −7.28275E−04 | 1.59507E−02 | −7.58862E−03 | 1.03982E−01 | 4.19386E+01 | −5.07651E−01 |
| B7 | −3.35769E−04 | 1.42134E−02 | 2.56911E−02 | 9.07659E−02 | −7.32241E+00 | −4.79654E−01 |
| B8 | −1.66708E−05 | 5.98718E−03 | 1.55180E−02 | −7.19263E−02 | −1.16765E+02 | −1.99421E−02 |
| B9 | 5.48457E−06 | 1.76950E−03 | −1.01244E−02 | −2.31179E−01 | −2.05461E+02 | 2.23433E−01 |
| B10 | 2.94844E−06 | 3.49055E−04 | −1.05712E−02 | −1.46836E−01 | 3.06765E+02 | 1.98625E−01 |
| B11 | 7.66224E−07 | −9.10422E−06 | 6.98577E−03 | 3.40243E−01 | 1.24788E+03 | 4.87681E−02 |
| B12 | −4.55085E−07 | 1.67721E−04 | 3.50721E−03 | 3.62882E−01 | −1.23609E+02 | −4.01000E−02 |
| B13 | 2.79048E−08 | −1.17740E−04 | 3.46179E−05 | −4.26407E−01 | −1.46026E+03 | −8.00882E−02 |
| B14 | 2.13818E−08 | −1.22801E−04 | −9.76669E−04 | −1.58026E−01 | −4.29154E+03 | −7.21198E−02 |
| B15 | 2.70029E−09 | −9.95358E−05 | −7.24014E−04 | 3.71367E−01 | −2.48870E+03 | −3.81540E−02 |
| B16 | −2.08418E−11 | −5.95721E−05 | −1.72317E−04 | −1.73004E−01 | 3.90785E+03 | −3.40811E−03 |
| B17 | −3.07301E−10 | −5.87676E−06 | 7.76509E−05 | −1.15248E−01 | 4.89569E+04 | 2.49488E−02 |
| B18 | −1.04451E−10 | 1.59770E−05 | 1.22502E−04 | 7.92831E−02 | −1.03816E+04 | 5.24711E−02 |
| B19 | −2.12801E−11 | 1.75335E−05 | 5.74867E−05 | 7.45945E−02 | −1.61341E+05 | 2.08947E−02 |
| B20 | 1.06923E−11 | −5.70883E−06 | −3.76538E−05 | −4.45259E−02 | 1.36169E+05 | −3.07516E−02 |

SN: Surface Number

Example 6

Figure 7:
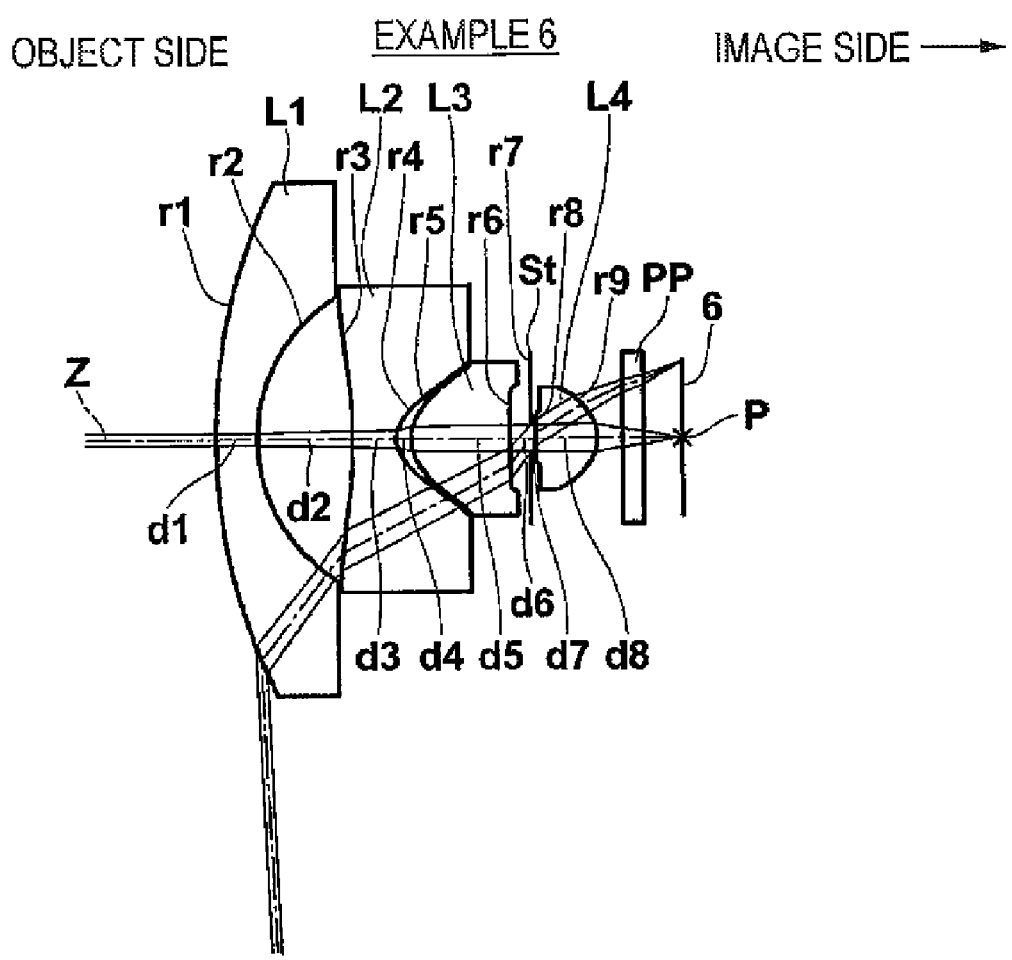
FIG. 7 is a section diagram showing the configuration of an ultra wide-angle imaging lens device according to Example 6 of the invention.
Figure 8:
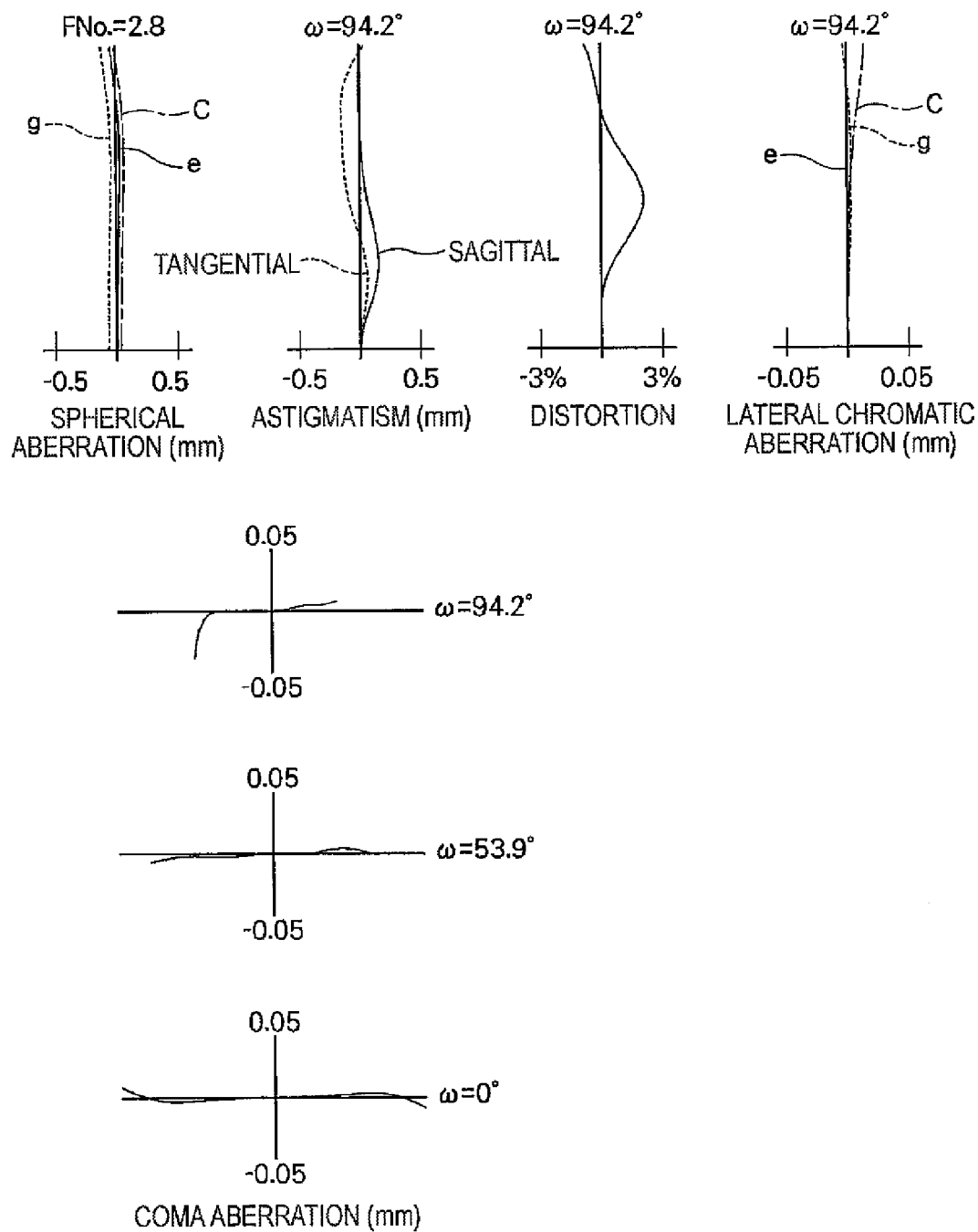
FIG. 8 is a diagram showing various aberrations of the ultra wide-angle imaging lens device according to Example 1 of the invention.
Figure 9:
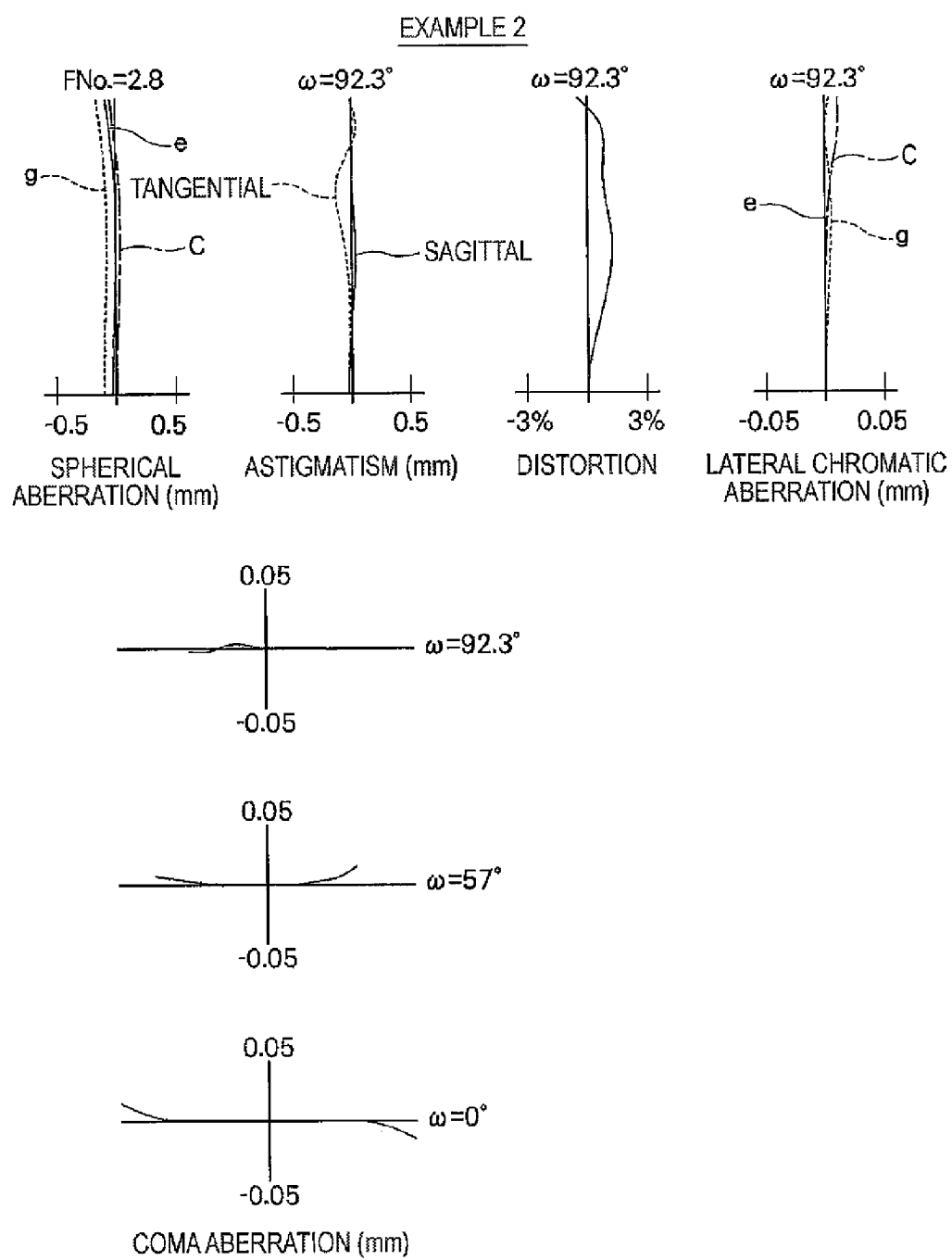
FIG. 9 is a diagram showing various aberrations of the ultra wide-angle imaging lens device according to Example 2 of the invention.
Figure 10:
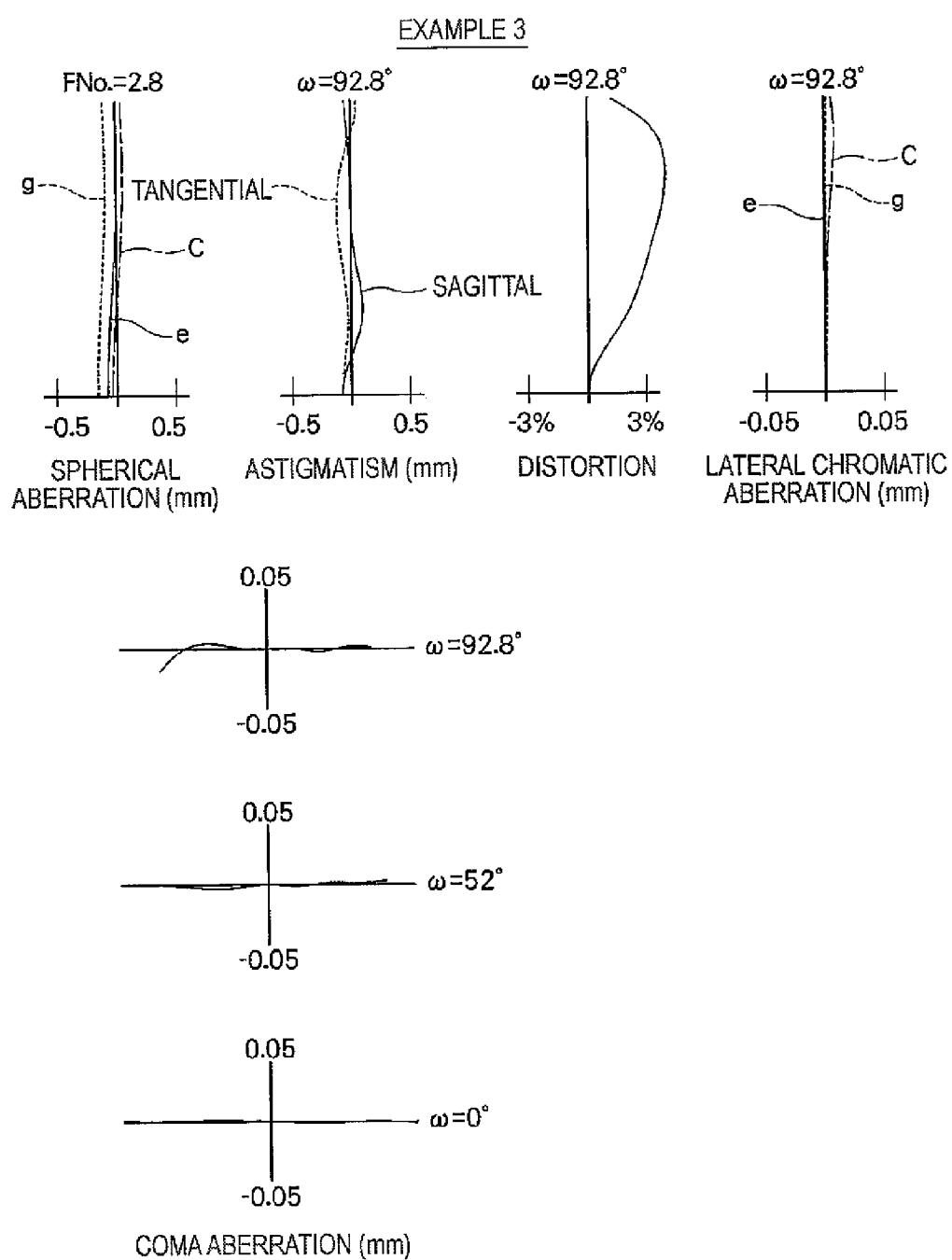
FIG. 10 is a diagram showing various aberrations of the ultra wide-angle imaging lens device according to Example 3 of the invention.
Figure 12:
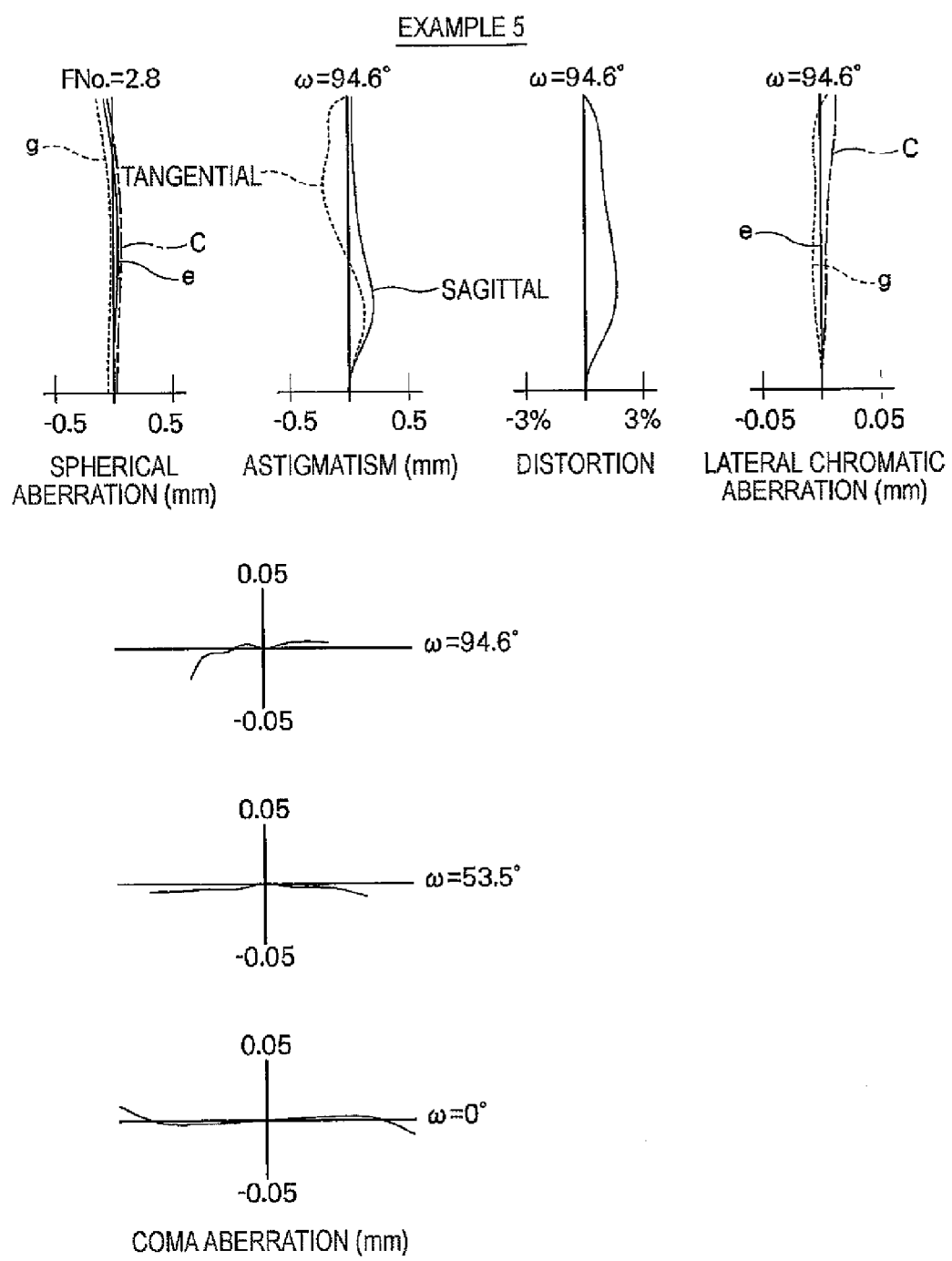
FIG. 12 is a diagram showing various aberrations of the ultra wide-angle imaging lens device according to Example 5 of the invention.
Figure 13:
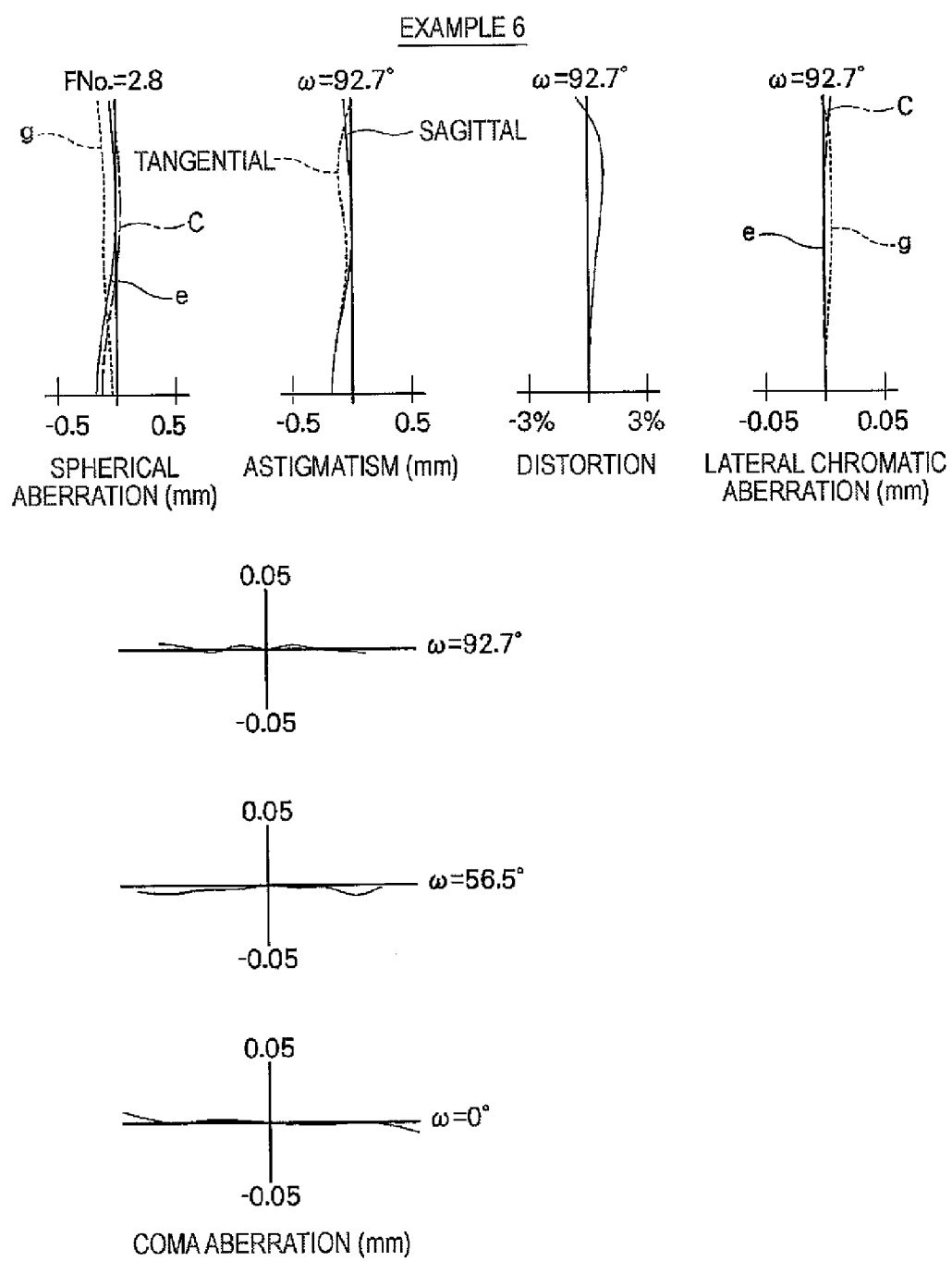
FIG. 13 is a diagram showing various aberrations of the ultra wide-angle imaging lens device according to Example 6 of the invention.

Table 11 shows lens data and various data of the ultra wide-angle imaging lens device according to Example 6. Table 12 shows coefficients of the aspheric surface expressions with regard to the respective aspheric surfaces. FIG. 7 is a section view illustrating the configuration of the lens device. In FIG. 7, the reference signs ri and di correspond to the reference signs ri and di in Table 11.

In Example 6, as lens materials, an optical glass is used in the first lens L1, a polyolefin based plastic is used in the second lens L2 and the fourth lens L4, and a nanocomposite resin material containing an inorganic material is used in the third lens L3.

TABLE 11

<Example 6> Lens Data

| SN | ri | di | Nej | vdj |
|---|---|---|---|---|
| 1 | 13.238 | 1.000 | 1.88815 | 40.8 |
| 2 | 3.902 | 2.228 | | |
| 3* | 16.279 | 1.000 | 1.53387 | 55.5 |
| 4* | 0.581 | 0.368 | | |

TABLE 11-continued

| 5* | 0.986 | 2.308 | 1.65642 | 23.9 |
|---|---|---|---|---|
| 6* | −10.027 | 0.497 | | |
| 7 (St) | ∞ | 0.098 | | |
| 8* | −44.923 | 1.469 | 1.51222 | 56.2 |
| 9* | −0.892 | | | |

| Various Data | |
|---|---|
| f | 0.856 |
| FNo. | 2.8 |
| 2ω | 185.4 |
| Bf | 1.755 |
| L | 10.724 |
| IH | 1.791 |

SN: Surface Number
St: Aperture Diaphragm

TABLE 12

<Example 6> Aspheric Surface Coefficients

SN

| | 3 | 4 | 5 | 6 | 8 | 9 |
|---|---|---|---|---|---|---|
| K | 0 | 0 | 0 | 0 | 0 | 0 |
| B3 | −9.04202E−02 | −8.10185E−02 | −3.01215E−02 | 1.08327E−01 | 4.06092E−01 | 2.10139E−01 |
| B4 | 2.86551E−02 | −9.22585E−02 | 7.77138E−02 | −4.88323E−02 | −1.00915E+00 | −6.80758E−01 |
| B5 | 2.35548E−03 | −3.54142E−02 | −7.04652E−02 | 8.60888E−03 | −8.76565E+00 | 7.62825E−01 |
| B6 | −9.52642E−04 | 2.88383E−02 | −1.40473E−02 | 4.44752E−02 | 3.94737E+01 | −1.85469E−01 |
| B7 | −3.09878E−04 | 1.43028E−02 | 2.56085E−02 | 4.26573E−03 | −7.65624E+00 | −1.71242E−01 |
| B8 | 1.91645E−07 | 3.27292E−03 | 1.53427E−02 | −7.42495E−02 | −9.49214E+01 | −5.26027E−02 |
| B9 | 1.16071E−05 | −3.80577E−04 | −1.05461E−02 | −1.46471E−01 | −1.94626E+02 | 1.04811E−02 |
| B10 | 3.69303E−06 | −9.67386E−04 | −1.09618E−02 | −5.69295E−02 | 2.19818E+02 | 8.34355E−02 |
| B11 | 7.11550E−07 | −7.84662E−04 | 6.59109E−03 | 3.42824E−01 | 1.27736E+03 | 9.20990E−02 |
| B12 | −5.09441E−07 | −4.86147E−04 | 3.32262E−03 | 3.29423E−01 | −4.43591E+01 | 3.69079E−02 |
| B13 | 5.43443E−09 | −3.00290E−04 | 9.34174E−06 | −4.86723E−01 | −1.63895E+03 | −4.18493E−02 |
| B14 | 1.62346E−08 | −1.12723E−04 | −9.45289E−04 | −2.16665E−01 | −5.41964E+03 | −7.40039E−02 |
| B15 | 1.78526E−09 | −9.76432E−07 | −6.83568E−04 | 3.75874E−01 | −4.74001E+03 | −5.68306E−02 |
| B16 | −1.37499E−11 | 3.86071E−05 | −2.20265E−04 | −1.56178E−01 | 5.56804E+03 | −1.89880E−02 |
| B17 | −2.23160E−10 | 3.13007E−05 | 8.50573E−05 | −8.39542E−02 | 7.21776E+04 | 1.79625E−02 |
| B18 | −6.33876E−11 | 1.76825E−05 | 1.35094E−04 | 1.01266E−01 | −3.41357E+04 | 5.19281E−02 |
| B19 | −1.25175E−11 | 1.07817E−05 | 6.48785E−05 | 7.57319E−02 | −1.61302E+05 | 2.33067E−02 |
| B20 | 7.58620E−12 | −9.84721E−06 | −4.19500E−05 | −6.07709E−02 | 1.35764E+05 | −2.79758E−02 |

SN: Surface Number

Table 13 shows values, which correspond to the conditional expressions (1) to (13), of the ultra wide-angle imaging lens device according to Examples 1 to 6. As can be seen from Table 13, the ultra wide-angle imaging lens devices according to Examples 1 to 6 satisfy all of the conditional expressions (1) to (13). Also, the ultra wide-angle imaging lens devices according to Examples 1, 2, and 4 to 6 satisfy the conditional expression (3-1), and the ultra wide-angle lens devices according to Examples 1, 2, and 6 satisfy the conditional expression (11-1).

Also, in the aberration diagrams of distortion, an ideal image height is set to $2 \times f \times \tan(\omega/2)$. The reason is that the ultra wide-angle lens according to the invention is a lens based on the stereographic projection in which an image height $y = 2 \times f \times \tan(\omega/2)$ is used as a reference, and that the ultra wide-angle lens is designed to further enlarge a peripheral image as compared with normal lenses based on an equidistance projection in which an image height $y = f \times \omega$ is used as a reference. As can be seen from FIGS. 8 to 13, the lens systems in Examples 1 to 6 well corrected aberrations,

TABLE 13

| | Example 1 | Example 2 | Example 3 | Example 4 | Example 5 | Example 6 |
|---|---|---|---|---|---|---|
| (1) $L/f_{34}$ | −1.004 | −2.111 | 2.513 | 2.403 | 2.782 | 1.180 |
| (2) $D_2/L$ | 0.248 | 0.226 | 0.189 | 0.240 | 0.221 | 0.208 |
| (3) $D_4/L$ | 0.015 | 0.016 | 0.086 | 0.034 | 0.039 | 0.034 |
| (4) $N_1$ | 1.77621 | 1.77621 | 1.77621 | 1.77621 | 1.77621 | 1.888 |
| (5) $D_5/L$ | 0.211 | 0.218 | 0.206 | 0.202 | 0.206 | 0.215 |
| (6) $F_2/L$ | −0.110 | −0.104 | −0.131 | −0.175 | −0.201 | −0.108 |
| (7) $F_3/L$ | 0.128 | 0.119 | 0.174 | 0.203 | 0.229 | 0.139 |
| (8) $F_4/L$ | 0.136 | 0.137 | 0.194 | 0.129 | 0.125 | 0.164 |
| (9) $\nu_1$ | 49.6 | 49.6 | 49.6 | 49.6 | 49.6 | 40.8 |
| (10) $\nu_2$ | 55.5 | 55.5 | 55.5 | 55.5 | 55.5 | 55.5 |
| (11) $\nu_3$ | 26.9 | 26.9 | 30.3 | 30.3 | 30.3 | 23.9 |
| (12) $\nu_4$ | 55.5 | 55.5 | 56.2 | 55.5 | 55.5 | 56.2 |
| (13) da/L | 0.012 | 0.011 | 0.012 | 0.010 | 0.005 | 0.009 |

FIGS. 8 to 13 are aberration diagrams showing spherical aberration, astigmatism, distortion, lateral chromatic aberration, and coma aberration of the ultra wide-angle imaging lens devices according to Examples 1 to 6. Each aberration diagram shows aberrations with e-line being used as a reference wavelength. Furthermore, the spherical aberration diagrams and the lateral chromatic aberration diagrams show aberrations at the C-line (656.3 nm in wavelength) and aberrations at the g-line (436 nm in wavelength), and those are represented by the reference signs e, C, and g. FNo. Shown in the vertical axis in the spherical aberration diagram is a F number, ω shown in the vertical axis in the other aberration diagrams is a half angle of view.

and particularly are excellent in that distortion does not rapidly increase in peripheral portions.

The ultra wide-angle imaging lens device 1 and the ultra wide-angle imaging lens device according to Example 1 to 6 are suitable for use in an on-vehicle camera or the like for taking images of the front, side, and rear of a vehicle.

Figure 14:
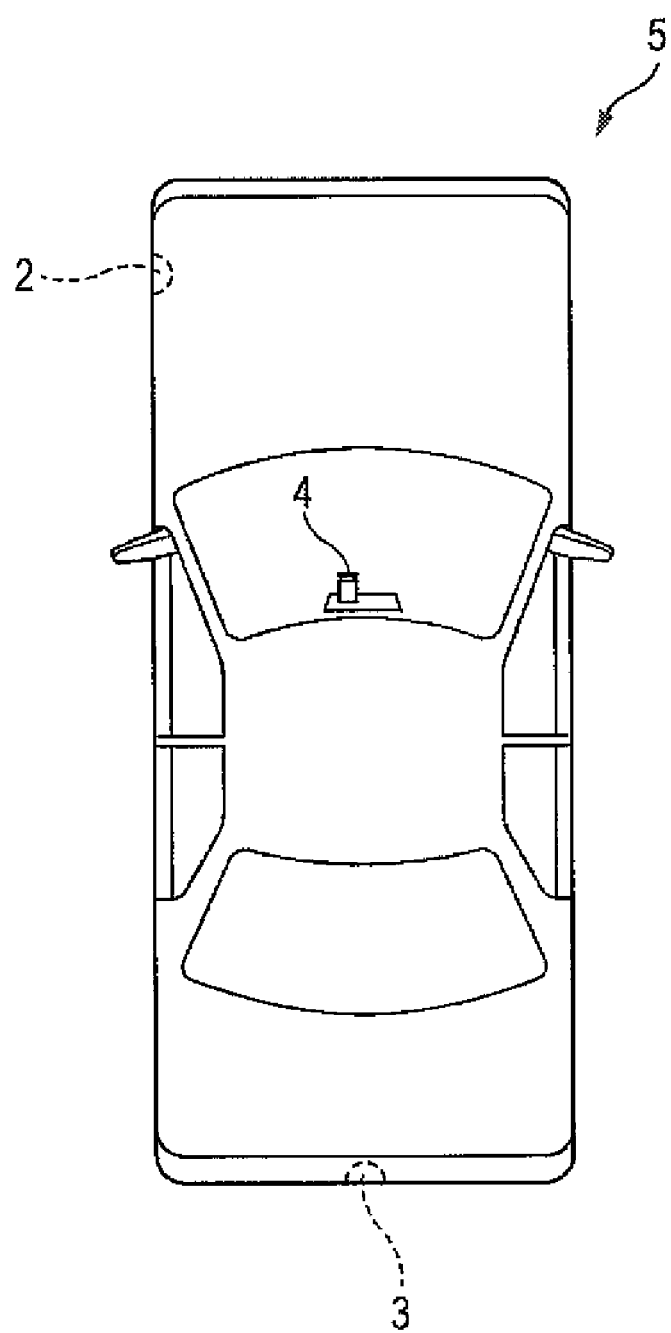
FIG. 14 is a diagram for explaining arrangement of an on-vehicle imaging apparatus according to the embodiment of the invention.

As a use example, FIG. 14 shows that the ultra wide-angle imaging lens device and the imaging apparatus according to the embodiment are mounted on a vehicle 5. In FIG. 14, the vehicle 5 includes an outside-vehicle camera 2 for photographing a blind spot area on the passenger-seat side, an outside-vehicle camera 3 for photographing a blind spot area in the rear of the vehicle 5, and an in-vehicle camera 4 disposed on the rear of a room mirror so as to photograph the same visual field range as a driver. Each of the outside-vehicle camera 2, the outside-vehicle camera 3, and the in-vehicle camera 4 is an imaging apparatus, and includes the ultra wide-angle imaging lens devices 1 according to the embodiment of the invention and the imaging device 6, which converts an optical image formed by the ultra wide-angle imaging lens device 1 into an electric signal.

As described above, the ultra wide-angle imaging lens device 1 according to the embodiment of the invention has a small size and good optical performance while securing an ultra wide-angle greater than 180 degrees. Thus, it is possible to decrease sizes of the outside-vehicle cameras 2 and 3 and the in-vehicle camera 4, and it is also possible to form a good image in the wide range of the angle of view on the image formation surface of the imaging device 6.

The invention has been described with reference to the embodiment and the examples, but the invention is not limited there, and may be modified in various ways. For example, the values of a radius of curvature, the on-axis surface spacing, and refractive indices of the lenses are not limited to the values described in the numerical examples, and may have other values.

Also, in the embodiment of the imaging apparatus, the example in which the invention is applied to the on-vehicle camera has been described with reference to the drawing, but the invention is not limited to this application, and is also applicable to, for example, a cell phone camera or a surveillance camera.

What is claimed is:

1. An ultra wide-angle imaging lens device comprising, in order from an object side:
   a negative first lens having a meniscus shape with a convex surface directed to the object side;
   a negative second lens having a concave surface directed to an image side and having at least one aspheric surface;
   a positive third lens having a convex surface directed to the object side and having at least one aspheric surface;
   a stop; and
   a positive fourth lens having a convex surface directed to the image side and having at least one aspheric surface,
   wherein
   the following conditional expression (1) is satisfied:

$$-3.2 < L/f_{3,4} < 3.2 \tag{1}$$

where L denotes a distance on an optical axis from an object side surface of the first lens to an image formation surface, and
   $f_{3,4}$ denotes a composite focal length of the third and fourth lenses.

2. The ultra wide-angle imaging lens device according to claim 1, wherein the following conditional expression (2) is satisfied:

$$0.18 < d_2/L < 0.30 \tag{2}$$

where $d_2$ denotes an on-axis space between the first lens and the second lens.

3. The ultra wide-angle imaging lens device according to claim 2, wherein the following conditional expression (3) is satisfied:

$$d_4/L < 0.10 \tag{3}$$

where $d_4$ denotes an on-axis space between the second lens and the third lens.

4. The ultra wide-angle imaging lens device according to claim 3, wherein the following conditional expression (5) is satisfied:

$$0.17 < d_5/L < 0.30 \tag{5}$$

where $d_5$ denotes a thickness of the third lens on the optical axis.

5. The ultra wide-angle imaging lens device according to claim 4, wherein the following conditional expression (6) is satisfied:

$$-0.22 < f_2/L < -0.08 \tag{6}$$

where $f_2$ denotes a focal length of the second lens.

6. The ultra wide-angle imaging lens device according to claim 5, wherein the following conditional expression (7) is satisfied:

$$0.10 < f_3/L < 0.25 \tag{7}$$

where $f_3$ denotes a focal length of the third lens.

7. The ultra wide-angle imaging lens device according to claim 6, wherein the following conditional expression (8) is satisfied.

$$0.10 < f_4/L < 0.20 \tag{8}$$

where $f_4$ denotes a focal length of the fourth lens.

8. The ultra wide-angle imaging lens device according to claim 7, wherein the following conditional expression (13) is satisfied:

$$da/L < 0.02 \tag{13},$$

where da denotes an on-axis space between the stop and the fourth lens.

9. The ultra wide-angle imaging lens device according to claim 8, wherein an angle of view of the ultra wide-angle imaging lens device is greater than 180 degrees.

10. An imaging apparatus comprising:
    the ultra wide-angle imaging lens device according to claim 9; and
    an imaging device that converts an optical image formed by the ultra wide-angle imaging lens device into an electric signal.

11. The ultra wide-angle imaging lens device according to claim 1, wherein the following conditional expression (3) is satisfied:

$$d_4/L < 0.10 \tag{3}$$

where $d_4$ denotes an on-axis space between the second lens and the third lens.

12. The ultra wide-angle imaging lens device according to claim 1, wherein the following conditional expression (4) is satisfied:

$$N_1 > 1.7 \tag{4}$$

where $N_1$ denotes a refractive index of the first lens at the e-line.

13. The ultra wide-angle imaging lens device according to claim 1, wherein the following conditional expression (5) is satisfied:

$$0.17 < d_5/L < 0.30 \tag{5}$$

where $d_5$ denotes a thickness of the third lens on the optical axis.

14. The ultra wide-angle imaging lens device according to claim 1, wherein the following conditional expression (6) is satisfied:

$$-0.22 < f_2/L < -0.08 \tag{6}$$

where $f_2$ denotes a focal length of the second lens.

15. The ultra wide-angle imaging lens device according to claim 1, wherein the following conditional expression (7) is satisfied:

$$0.10 < f_3/L < 0.25 \qquad (7)$$

where $f_3$ denotes a focal length of the third lens.

16. The ultra wide-angle imaging lens device according to claim 1, wherein the following conditional expression (8) is satisfied:

$$0.10 < f_4/L < 0.20 \qquad (8)$$

where $f_4$ denotes a focal length of the fourth lens.

17. The ultra wide-angle imaging lens device according to claim 1, wherein the following conditional expressions (9) to (12) are satisfied:

$$\nu_1 \geq 40 \qquad (9)$$

$$\nu_2 \geq 50 \qquad (10)$$

$$\nu_3 \leq 40 \qquad (11)$$

$$\nu_4 \geq 50 \qquad (12)$$

where $\nu_1$ denotes an Abbe number of the first lens at the d-line, $\nu_2$ denotes an Abbe number of the second lens at the d-line, $\nu_3$ denotes an Abbe number of the third lens at the d-line, and $\nu_4$ denotes an Abbe number of the fourth lens at the d-line.

18. The ultra wide-angle imaging lens device according to claim 1, wherein the following conditional expression (13) is satisfied:

$$da/L < 0.02 \qquad (13),$$

where da denotes an on-axis space between the stop and the fourth lens.

19. The ultra wide-angle imaging lens device according to claim 1, wherein an angle of view of the ultra wide-angle imaging lens device is greater than 180 degrees.

20. An imaging apparatus comprising:

the ultra wide-angle imaging lens device according to claim 1; and an imaging device that converts an optical image formed by the ultra wide-angle imaging lens device into an electric signal.

* * * * *